(12) United States Patent
Konstantakopoulos

(10) Patent No.: US 6,308,799 B1
(45) Date of Patent: Oct. 30, 2001

(54) INTEGRATED MUFFLER-BUMPER SYSTEM

(75) Inventor: George A Konstantakopoulos, Madison Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/574,588

(22) Filed: May 18, 2000

(51) Int. Cl.⁷ ..................................................... F01M 1/00
(52) U.S. Cl. ............................................. 181/282; 181/272
(58) Field of Search ........................... 293/117; 181/255, 181/256, 258, 269, 272, 282

(56) References Cited

U.S. PATENT DOCUMENTS

| 5,563,382 | * | 10/1996 | Choyce | 181/230 |
| 5,726,398 | * | 3/1998 | Zahn et al. | 181/282 |
| 5,860,685 | * | 1/1999 | Horney et al. | 293/113 |
| 6,161,646 | * | 12/2000 | Curl | 181/252 |

* cited by examiner

*Primary Examiner*—Robert E. Nappi
*Assistant Examiner*—Kim Lockett
(74) *Attorney, Agent, or Firm*—Mark P Calcaterra

(57) ABSTRACT

A space efficient, structurally rigid, integrated muffler and bumper assembly is provided. The muffler and bumper assembly comprises an extruded skeleton, an energy absorbing bumper, and a bumper fascia. The extruded skeleton is formed such that internal cavities or passage flow chambers exist. In turn, the walls of the flow chambers maintain a plurality of holes, allowing for passage of exhaust gases between chambers. The extruded skeleton also has an inlet and outlet for exhaust gas flow. Arms having tabs on the ends thereof extend from the top and bottom of the extruded skeleton such that the energy absorbing bumper, which maintains recesses in the top and bottom portions, snap-fits with the extruded skeleton. The extruded skeleton/bumper assembly is welded or otherwise mechanically fastened to the vehicle frame rails. The bumper fascia is introduced over the extruded skeleton/bumper assembly generally masking the assembly with the overall vehicle design. Both the energy absorbing bumper and the bumper fascia have bores formed therein to receive the exhaust outlet of the extruded skeleton.

21 Claims, 3 Drawing Sheets

INTEGRATED MUFFLER-BUMPER SYSTEM

FIELD OF THE INVENTION

The present invention relates generally to vehicle safety and exhaust systems and more particularly to an integrated assembly including a muffler system and extruded bumper retention system.

BACKGROUND AND SUMMARY OF THE INVENTION

It is a consistent drive of the automotive industry as a whole to reduce the overall complexity of motor vehicles. Original Equipment Manufacturers (OEM) and suppliers alike seek to reduce the total amount of parts that comprise a particular vehicle build which usually can exceed 5000. It is a further objective of OEM's to improve the overall vehicle packaging constraints so as to provide aperture with either more interior room or ground clearance. Consisting contemporaneously with these drives is the desire to improve consumer satisfaction and occupant safety.

Some of these objectives can be met by enhancing the exhaust systems and collision of a vehicle. In particular, by integrating the muffler into the rear bumper system of a vehicle there is a reduction in the amount of parts needed for vehicle assembly which reduces production time. Vehicle packaging constraints are also improved by moving the muffler up away from the lower portion of the vehicle into the bumper region thereof.

It is an object of a prior invention, U.S. Pat. No. 5,726,398, to achieve these objectives through integrating the muffler into the bumper system. However, the muffler components of the prior invention are those of a traditional method of producing mufflers housed within the bumper. Therefore, the muffler portion of the combined systems is more complex than need be. There continues to be a need in the art to provide a simple, cost effective, and compact way of providing a truly integrated bumper and exhaust system.

It is an object of the present invention to achieve the objectives set by OEM's and sub-suppliers alike both by fully integrating the muffler into the bumper system as well as designing a simpler, longer lasting muffler system itself. This is achieved via an extruded skeleton acting as a muffler. The extrusion process used to form the skeleton creates gas exhaust flow channels along the length of the muffler. These gas exhaust channels incorporate exhaust passage holes for allowing the flow of exhaust gases between channels. Exhaust inlet and outlets are formed on opposing sides of the extruded skeleton which allow for exhaust gases to enter and exit the muffler respectively.

Several advantages of the extruded skeleton formation are readily apparent. Initially, the near square form of the exhaust chambers allow for more efficient utilization of space reducing the overall size of the muffler, thus lowering packaging needs. Additionally, active or semi-active noise attenuation components can be easily integrated into the flow chambers of the extruded skeleton. Traditional muffler construction employs thin-walled sheet metal which is susceptible to fatigue and corrosion. The extruded skeleton, being formed as such, allows for greater wall thickness, improving the wearability and corrosion characteristics of the muffler. Finally, this method of producing the muffler system allows for a more rigid structure than that of traditional muffler systems. This added rigidity can be utilized in several ways including crash resistance and/or improving the rigidity of the overall frame structure as the skeleton can be attached directly to the frame members.

Further areas of applicability of the present invention have become apparent from the detailed description provided hereinafter. It should be understood, however, that the detailed description and the specific examples, while indicating preferred embodiments of the invention, are intended for purposes of illustration only, since various changes and modifications within the spirit and scope of the invention will be apparent to those skilled in the art from the detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
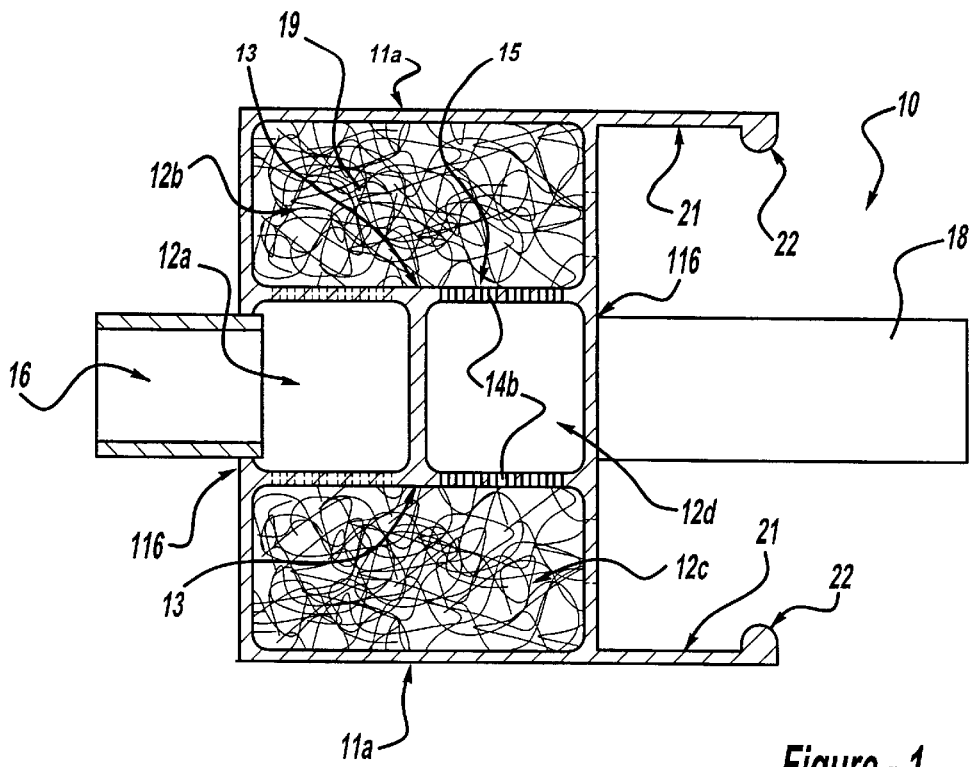
FIG. 1 is a cross sectional view of the extruded skeleton of the integrated muffler and bumper system according to the principles of the present invention.
Figure 5:
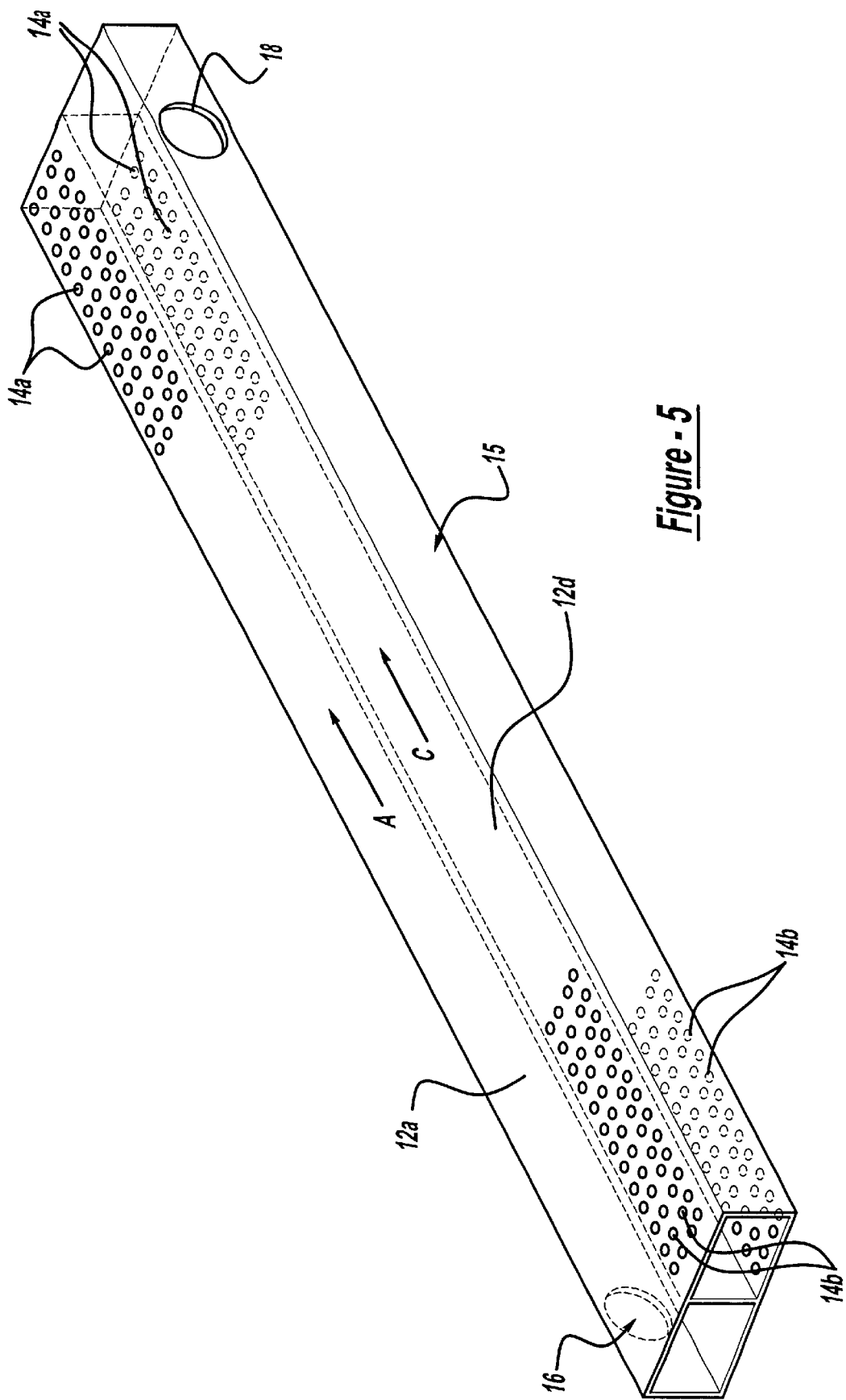
FIG. 5 is a perspective view of the center section of the extruded skeleton of the integrated muffler and bumper system illustrating the exhaust passage holes and flow direction.

With reference to FIG. 1, the extruded skeleton of the integrated muffler and bumper system will now be described. The extruded skeleton 10 is formed so as to have top and bottom walls 11a, side walls 11b and a plurality of internal walls 13, which form top and bottom walls 11a, side walls 11b and a plurality of internal walls 13, which form a plurality of internal cavities 12a–d. The internal cavities 12a–d act as exhaust gas flow chambers of the muffler and are near-square in shape. Portions of internal walls 13 maintain a plurality of holes 14 allowing for passage between the internal cavities 12a–12d of exhaust gases. With reference to FIG. 5, the center section 15 of the extruded skeleton is shown with the upper and lower cavities removed for clarity. The exhaust gases enter the center section 15 through the exhaust inlet port 16. The gases flow in the direction of arrow "A" to the opposite end of internal cavity 12a. The gases then flow through the upper and lower exhaust passage holes 14a and thereby enter the internal cavities 12b, 12c best shown in FIG. 1. The gases then flow in an opposite direction to arrow "A" along the internal cavities 12b, 12c and pass through upper and lower exhaust passage holes 14b and enter the internal cavity 12d. The gases then follow the direction of arrow "C" along the internal cavity 12d and exit through the outlet port 18. Noise attenuation material 19 can also be introduced into internal cavities 12a–d, including active or semi-active. Exhaust gas inlet 16 is connected to a back face of the extruded skeleton and exhaust gas outlet 18 is connected to a front face of the extruded skeleton 10. Both the top and bottom walls 11a include an extended tab portion 21 projecting therefrom in a cantilevered manner. It should now be noted that the tab portions 21 extend the full lateral length of the extruded skeleton 10. Located at the distal end of the tab portion 21 is a mounting rib 22. The mounting rib 22 also runs the full lateral length of the extruded skeleton 10.

Figure 2:
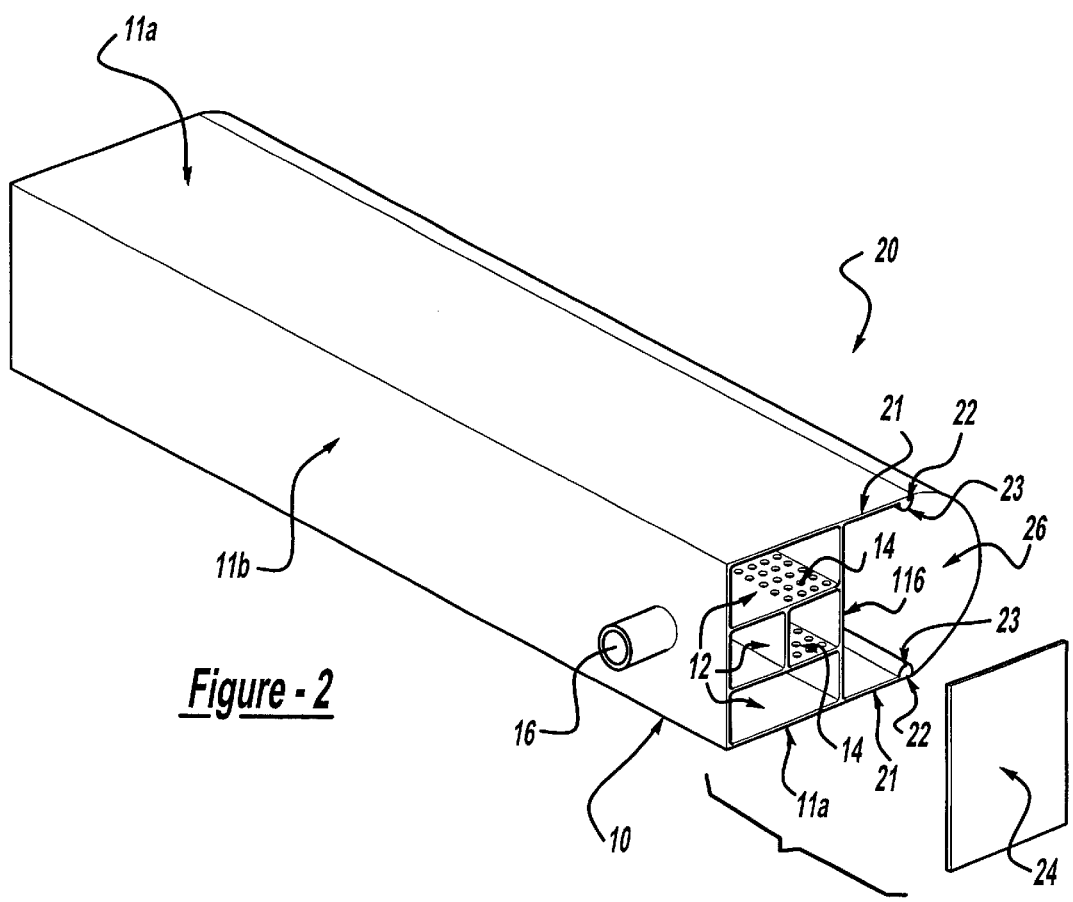
FIG. 2 is a perspective view of the integrated muffler and bumper according to the principles of the present invention.
Figure 3:
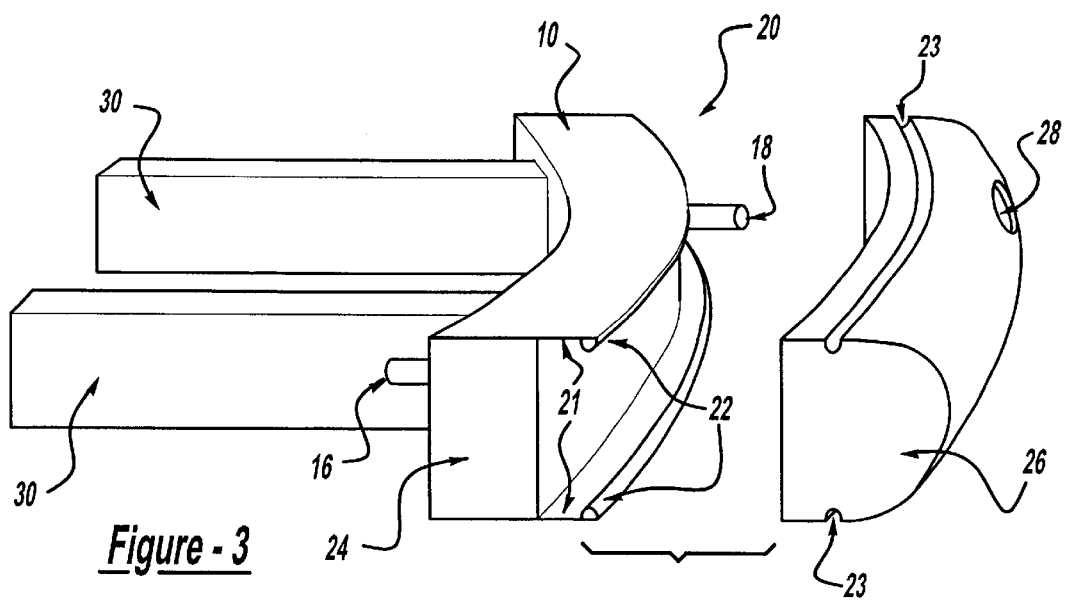
FIG. 3 is an exploded perspective view of the integrated muffler and bumper system according to the principles of the present invention.

FIG. 2 displays a subassembly of an integrated bumper/muffler system. The subassembly 20 comprises the extruded skeleton 10, endplates 24, and an energy absorbing bumper 26. The end plates 24 can be mechanically or adhesively fastened to the skeleton 10. FIG. 3 displays a more detailed view for mounting the extruded skeleton 10 to the vehicle frame and mounting of the energy absorbing bumper 26 to the extruded skeleton 10, thus forming subassembly 20. The extruded skeleton 10 is welded directly to frame rails 30. The extruded skeleton 10, being formed as such, offers a rigid frame cross member when attached to frame rails 30. This offers the vehicle improved stiffness and rigidity or conversely removes the need for a rear vehicle cross member.

The top and bottom surfaces of the energy absorbing bumper 26 have recessed grooves 23 integrally formed therein. The energy absorbing bumper 26 also has an exhaust portal 28 molded directly into it. The energy absorbing bumper 26 is then mounted to the extruded skeleton 10 via snap fit or slide fit means. The energy absorbing bumper 26 is pressed in between arms 21 causing said arms to bend in an outward fashion until the mounting ribs 22 reach the recessed groove 23 of the energy absorbing bumper 26. At this point, the arms 21 return and thereby form a secure connection between the bumper 26 and skeleton 10. Mounted as such, the exhaust gas portal 28 of energy absorbing bumper 26 services the passage of the exhaust gas outlet 18 of the extruded skeleton. This allows exhaust gases to escape.

Figure 4:
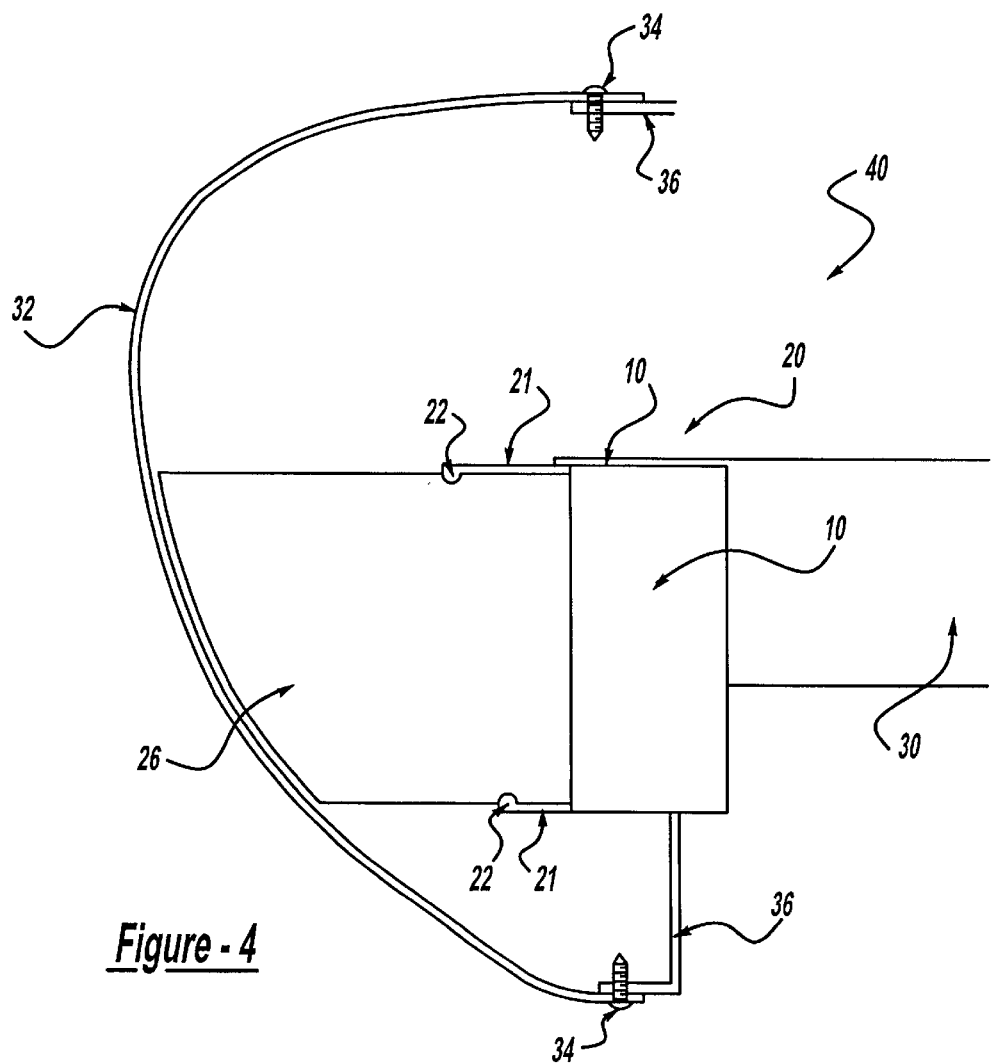
FIG. 4 is a sectional view of a vehicle bumper system according to the principles of the present invention.

An exhaust system thus formed would generally not blend with modern vehicle designs nor is it particularly catching to the eye. Therefore, such a system preferably includes an additional cover up cleaner to make it more aesthetically pleasing and form better into the overall vehicle design. With reference to FIG. 4, a side sectional view of a complete integrated muffler bumper assembly is depicted having such a covering. The assembly 40 is comprised of subassembly 20 as described earlier, with the introduction of a bumper fascia 32. In order to mount the bumper fascia 32, holding brackets 36 preferably are introduced. The holding brackets 36 may be attached to the vehicle at any of several locations, including the extruded skeleton 10. In the preferred embodiment, the fascia 32 is screwably attached to holding brackets 36 via screws 34. As described earlier, the subassembly 20 is attached to the frame rails 30 such that the complete bumper assembly 40 is rigidly attached to the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust system for directing exhaust gases from an internal combustion engine to an exhaust outlet, said exhaust system comprising:
   a skeleton having an inlet port and an outlet port for directing said exhaust gas therethrough, said skeleton includes a top wall, a bottom wall, and a side wall; and
   an energy absorbing bumper disposed next to said side wall of said skeleton;
   wherein said skeleton includes tabs extending therefrom that cooperate with said bumper to create a direct snap-fit engagement therebetween.

2. The exhaust system of claim 1, wherein said skeleton is extruded.

3. The exhaust system of claim 2, wherein said extruded skeleton further defines a plurality of substantially square flow chambers.

4. The exhaust system of claim 3, wherein said plurality of substantially square flow chambers include a plurality of exhaust passage holes formed therebetween.

5. The exhaust system of claim 3, wherein said plurality of substantially square flow chambers house noise attenuation material.

6. The exhaust system of claim 1, wherein said tabs maintain at least one mounting rib and said energy absorbing bumper maintains at least one recessed groove such that said energy absorbing bumper and said tabs have a snap-fit engagement.

7. The exhaust system of claim 1, wherein said extruded skeleton is made from aluminum.

8. The exhaust system of claim 1, further comprising a bumper fascia disposed over said energy absorbing bumper, wherein said energy absorbing bumper is configured generally in the shape of said bumper fascia providing support behind said bumper fascia.

9. The integrated muffler and bumper exhaust system of claim 8, wherein both said energy absorbing bumper and said bumper fascia have a bore formed therein for receiving said outlet port.

10. The exhaust system of claim 1, further comprising a plurality of end plates disposed on ends of said skeleton.

11. A vehicle having a structural frame extending longitudinally along said vehicle comprising:
    an integrated muffler and bumper exhaust system, wherein said integrated muffler and bumper exhaust system comprises:
    an extruded skeleton difining at least a top wall, a bottom wall, a side wall and a tab protruding outwardly therefrom, said extruded skeleton secured to the frame of the vehicle; and
    an energy absorbing bumper in engagement with said tab of said extruded skeleton.

12. The vehicle of claim 11, further comprising a bumper fascia disposed over said energy absorbing bumper, wherein said energy absorbing bumper is configured generally in the shape of said fascia providing support behind said fascia.

13. The vehicle of claim 11, wherein said tab of said extruded skeleton cooperates with said bumper to create a direct snap-fit engagement therebetween.

14. The vehicle of claim 11, wherein said extruded skeleton further defines a plurality of substantially square flow chambers.

15. The vehicle of claim 14, wherein said plurality of substantially square flow chambers include a plurality of exhaust passage holes formed therebetween.

16. The vehicle of claim 14, wherein said plurality of substantially square flow chambers house noise attenuation material.

17. The vehicle of claim 13, wherein said tab maintains at least one mounting rib and said energy absorbing bumper maintains at least one recessed groove such that said energy absorbing bumper and said tab gave a snap-fit engagement.

18. The vehicle of claim 11, wherein said extruded skeleton is made from aluminum.

19. The vehicle of claim 12, wherein both said energy absorbing bumper and said bumper fascia have a bore formed therein for receiving said outlet port.

20. The vehicle of claim 11, further comprising a plurality of end plates disposed on ends of said skeleton.

21. The vehicle of claim 11, wherein said extruded skeleton further defines a plurality of near square flow chambers, an inlet portal and an outlet portal.

* * * * *

UNITED STATES PATENT AND TRADEMARK OFFICE
CERTIFICATE OF CORRECTION

PATENT NO. : 6,308,799 B1
DATED : October 30, 2001
INVENTOR(S) : Konstantakopoulos et al.

It is certified that error appears in the above-identified patent and that said Letters Patent is hereby corrected as shown below:

<u>Title page,</u>
Item [75], Inventor, delete middle initial "A".

Signed and Sealed this

Fourth Day of November, 2003

JAMES E. ROGAN
*Director of the United States Patent and Trademark Office*